United States Patent
Khailany et al.

(10) Patent No.: US 9,489,201 B2
(45) Date of Patent: Nov. 8, 2016

(54) PARTITIONED REGISTER FILE

(71) Applicant: Nvidia Corporation, Santa Clara, CA (US)

(72) Inventors: Brucek Kurdo Khailany, Austin, TX (US); Mark Alan Gebhart, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 379 days.

(21) Appl. No.: 14/082,476

(22) Filed: Nov. 18, 2013

(65) Prior Publication Data
US 2015/0143061 A1 May 21, 2015

(51) Int. Cl.
*G06F 13/00* (2006.01)
*G06F 9/38* (2006.01)

(52) U.S. Cl.
CPC ...................... *G06F 9/38* (2013.01)

(58) Field of Classification Search
CPC ........... G06F 9/30; G06F 12/00; G06F 12/02
See application file for complete search history.

(56) References Cited

U.S. PATENT DOCUMENTS

| | | | | |
|---|---|---|---|---|
| 4,870,616 A * | 9/1989 | Gates | ................... | G11C 11/417 365/189.05 |
| 2007/0025151 A1* | 2/2007 | Lee | .................... | G11C 11/5621 365/185.11 |
| 2011/0072438 A1* | 3/2011 | Fiyak | ................... | G06F 9/3009 718/104 |
| 2011/0153664 A1* | 6/2011 | Lang | ................. | G06F 17/30286 707/776 |
| 2011/0161616 A1* | 6/2011 | Tarjan | .................... | G06F 9/384 711/170 |
| 2012/0079241 A1 | 3/2012 | Dally | | |
| 2013/0111180 A1* | 5/2013 | Wong | .................. | G06F 12/0246 711/173 |
| 2014/0122842 A1* | 5/2014 | Abernathy | ............ | G06F 9/3012 712/225 |

OTHER PUBLICATIONS

Mark Gebhart et al., "A Compile-Time Managed Multi-Level Register File Hierarchy," MICRO 2011, pp. 465-476, Porto Alegre, Brazil, Dec. 2011.
Mark Gebhart et al., "Energy-efficient Mechanisms for Managing Thread Context in Throughput Processors," ISCA 2011, pp. 235-246, San Jose, CA, Jun. 2011.
Mark Gebhart et al., "A Hierarchical Thread Scheduler and Register File for Energy-Efficient Throughput Processors," ASM Transactions on Computer Systems (TOCS), vol. 30 Issue 2, Apr. 2012, 8:1-8:38.
Mark Gebhart et al. "Unifying Primary Cache, Scratch, and Register File Memories in a Throughput Processor," MICRO 2012; pp. 96-106; Vancouver, Canada; Dec. 2012.
Mark Gebhart, "Energy-Efficient Mechanisms for Managing On-Chip Storage in Throughput Processors," The University of Texas at Austin Ph.D. Disseration; May 2012, 206 pages.

* cited by examiner

*Primary Examiner* — Charles Rones
*Assistant Examiner* — Han Doan
(74) *Attorney, Agent, or Firm* — Zilka-Kotab, PC

(57) ABSTRACT

A system includes a processing unit and a register file. The register file includes at least a first memory structure and a second memory structure. The first memory structure has a lower access energy than the second memory structure. The processing unit is configured to address the register file using a single logical namespace for both the first memory structure and the second memory structure.

17 Claims, 4 Drawing Sheets

PARTITIONED REGISTER FILE

TECHNICAL FIELD

This disclosure relates generally to electronics and more particularly to processor architectures.

BACKGROUND

A register file is typically an array of processor registers. A register file can be used by various types of processors, e.g., a processor acting as a central processing unit (CPU), or one or more processors of a graphics processing unit (GPU). A register file can be used to stage data between memory and functional units of the processor. In some examples, register files are implemented using static random-access memory (SRAM) with capacity that can be flexibly allocated between one or more executing threads. Because of that capacity, register file access energy can drive a significant fraction of a system energy usage during instruction execution. Reducing the amount of energy used for register file access can reduce the overall energy used by a system.

SUMMARY

In general, one aspect of the subject matter described in this specification can be embodied in a system that comprises: a processing unit; and a register file coupled to the processing unit, the register file comprising at least a first memory structure and a second memory structure, the first memory structure having a lower access energy than the second memory structure; wherein the processing unit is configured to address the register file using a single logical namespace for both the first memory structure and the second memory structure. A system of one or more processing units can be configured to perform particular actions by virtue of having software, firmware, hardware, or a combination of them installed on the system that in operation causes or cause the system to perform the actions.

These and other embodiments can each optionally include one or more of the following features. The system can include: a compiler that is configured to allocate, for each value of a plurality of values, the value to a register address in the single logical namespace for the register file; and a digital logic circuit that is configured to map each register address in the single logical namespace to the first memory structure or the second memory structure. The system can include a compiler that is configured to allocate, for each value of a plurality of values, the value to a register address in the single logical namespace for the register file based on the register address and a frequency of access for the value. The frequency of access for the value can be a compiler projected frequency of access. The compiler can be configured to, for each value: determine the number of times the value is read during a live range for the value; and divide the number of times the value is read by a lifetime of the live range to determine the frequency of access. The compiler can be configured to sort the values according to frequency of access into a sorted order and then allocate the values, in the sorted order, to the addresses in the namespace. The first memory structure can have a first storage capacity smaller than a second storage capacity of the second memory structure, wherein the first memory structure is implemented using a first storage technology and the second memory structure is implemented using a second storage technology, and wherein the first storage technology has a first area per unit of storage greater than a second area per unit storage for the second storage technology. The first memory structure can be implemented using an array of latches and the second memory structure is implemented using static random access memory (SRAM). The system can be configured to execute a plurality of threads and determine, at runtime, a number of register addresses per thread to map to the first and second memory structures The details of one or more disclosed implementations are set forth in the accompanying drawings and the description below. Other features, aspects, and advantages will become apparent from the description, the drawings and the claims.

DETAILED DESCRIPTION

Figure 1:
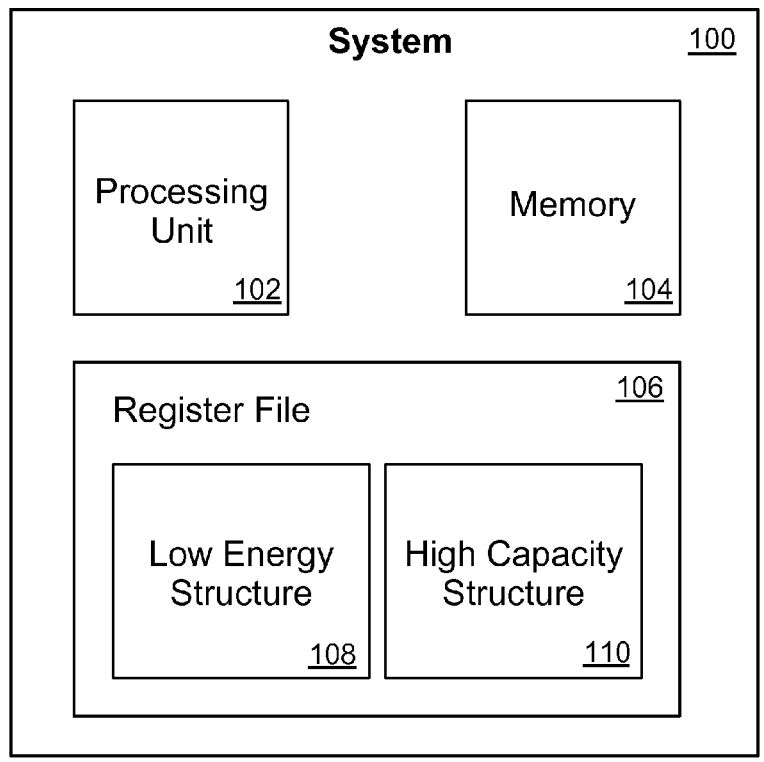
FIG. 1 is a block diagram of an example processing system including a processing unit, a memory unit, and a register file.

FIG. 1 is a block diagram of an example processing system 100 including a processing unit 102, a memory unit 104, and a register file 106. The register file 106 includes a low energy structure 108 and a high capacity structure 110.

The processing unit is a device that carries out the instructions of a program by performing operations, e.g., arithmetic, logical, and input and output operations. The processing unit can be, e.g., a central processing unit (CPU) of a computing system, or one of many processors in a graphics processing unit (GPU). Some processing units include an arithmetic logic unit (ALU) and a control unit (CU).

The memory unit is a device configured to store digital data, e.g., instructions for execution by the processing unit. Devices suitable for storing program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

The register file is configured to store digital data. Typically, the register file is configured to perform accesses for the processing unit more quickly than the memory unit. Since register accesses can be faster than memory accesses, the register file can be used to stage data between the memory unit and functional units of the processing unit.

Reducing the amount of energy used for register file access can reduce the overall energy used by the system. In some implementations, implementing the register file using a storage technology with a low access energy causes the register file to use more area in the system or to have a lower capacity, because some storage technologies with lower access energy have a lower storage capacity per unit area. The access energy of a structure is a measure of an amount of power drawn by the structure, e.g., an average amount of power drawn over a period of time, or an amount of power drawn for one or more accesses to the structure. In some implementations, accesses to the low-energy structure consume $\frac{1}{3}^{rd}$ or less energy compared to the high-energy structure.

To capture the benefits of lower access energy and higher storage capacity, the register file 106 includes both the low energy structure 108 and the high capacity structure 110. For example, the low energy structure can be an array of latches and the high capacity structure can be static random access memory (SRAM).

The system can allocate more frequently accessed values to the low energy structure to reduce energy used by the system. For example, a compiler can, while compiling source code into code executable by the processing unit, use compiler allocation techniques to allocate more frequently accessed values to a first region of the single register namespace that the system is more likely to map to the low energy structure and other values to a second region of the single register namespace that the system is more likely to map to the high capacity structure. Any of various appropriate compiler allocation techniques can be used.

The processing unit is configured to address the register file using a single logical namespace for both the low energy structure and the high capacity structure. The processing unit can be configured to use the single logical namespace by virtue of instructions, e.g., stored in the memory, that when executed by the processing unit cause the processing unit to use the namespace.

In some implementations, the compiler processes source code into executable instructions and allocates register storage based on register live ranges. A register live range can begin with an operation that writes a value to the register file and end when the value is read from the register file for the last time. The compiler allocates a live range to a particular register address in the register namespace.

For each live range, the compiler can determine a metric based on the energy savings potential of mapping the live range to the low energy structure. For example, the compiler can determine the metric as the number of times a value is read during a live range divided by a lifetime of the live range. The lifetime can be measured, e.g., as a number of instructions. Other metrics are possible. The compiler can then perform register allocation using the metric with a goal of allocating live ranges with higher metrics to a region of the single register namespace that the system is likely to map onto the low energy structure, e.g., one end of the single register namespace.

At run time, when the processing unit is executing instructions generated by the compiler, the system maps register addresses from the register namespace to the low energy structure and the high capacity structure. The system can use hardware, e.g., digital logic circuitry, to perform the mapping, or the system can use the processing unit executing software, or the system can use a combination of hardware and software. The processing unit addresses the register file by a register address that the system has mapped to one of the structures.

As an example, the system can map a first continuous range of identifiers to the low energy structure and a second continuous range of identifiers, adjacent to the first continuous range, to the high capacity structure. In some other examples, the system can map even numbered register addresses to the low energy structure and odd numbered register addresses to the high capacity structure. In those examples, the compiler is configured to allocate frequently accessed values to even numbered register addresses and less frequently accessed values to odd numbered register addresses.

Using the single logical namespace for both structures can simplify the compiler, because if compilation becomes difficult the compiler can rely on a conventional allocation scheme. Any allocation will be functionally correct and register allocation becomes an energy optimization task. An allocation that assigns frequently used values into a portion of the namespace that corresponds to the high capacity structure will function properly, but will use more register file access energy than if those values were assigned to a portion of the namespace that corresponds to the low energy structure.

Using the single logical namespace can also enable a more area-efficient design compared to some other multi-level register file designs. Because the low energy structure uses the same namespace as the high capacity structure, the size of the high capacity structure can be reduced compared to other multi-level register file designs that use a separate register namespace.

Figure 2:
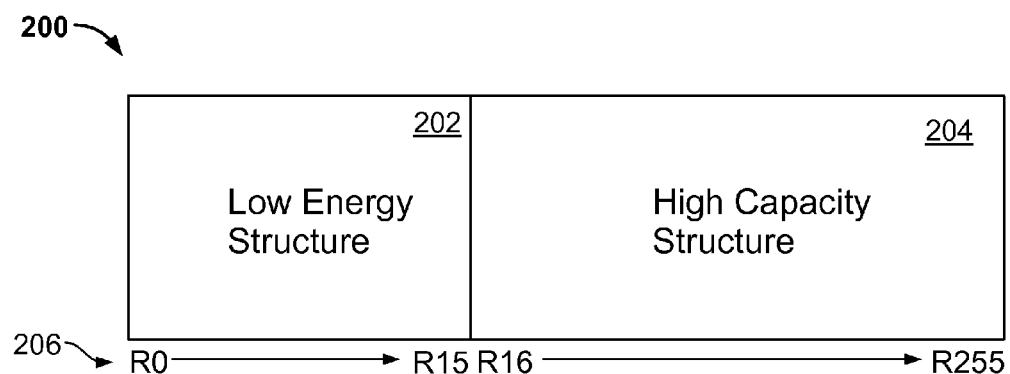
FIG. 2 is a block diagram of an example register file and a single namespace for the register file.

FIG. 2 is a block diagram of an example register file 200 and a single namespace 206 for the register file. The system 100 of FIG. 1 can use the register file 200, for example. The register file includes a low energy structure 202 with 16 storage locations and a high capacity structure 204 with 240 storage locations. The namespace includes addresses R0 through R255.

In some implementations, the system uses the namespace to encode information about how frequently a value will be accessed. For example, the system can use compiler-projected frequency of accesses for values, or the system can use historical frequency of access information. The system can allocate a value to a location in the register file by mapping between the frequency of access for a value to an address in the namespace.

For example, the most frequently accessed value can be allocated to the location at R0 and the least frequently accessed value can be allocated to the location at R255. The hardware will try and map the location at R0 to the low energy structure and the location at R255 to the high capacity structure.

In some implementations, the compiler is configured to allocate live ranges in batches. For a given batch of live ranges, the compiler can sort the live ranges into a sorted order and then allocate the live ranges, in the sorted order, to the addresses in the namespace. For example, the compiler can begin allocating values to one end of the namespace, at R0, and then move towards the other end of the namespace. In some implementations the number of batches is one.

Figure 3:
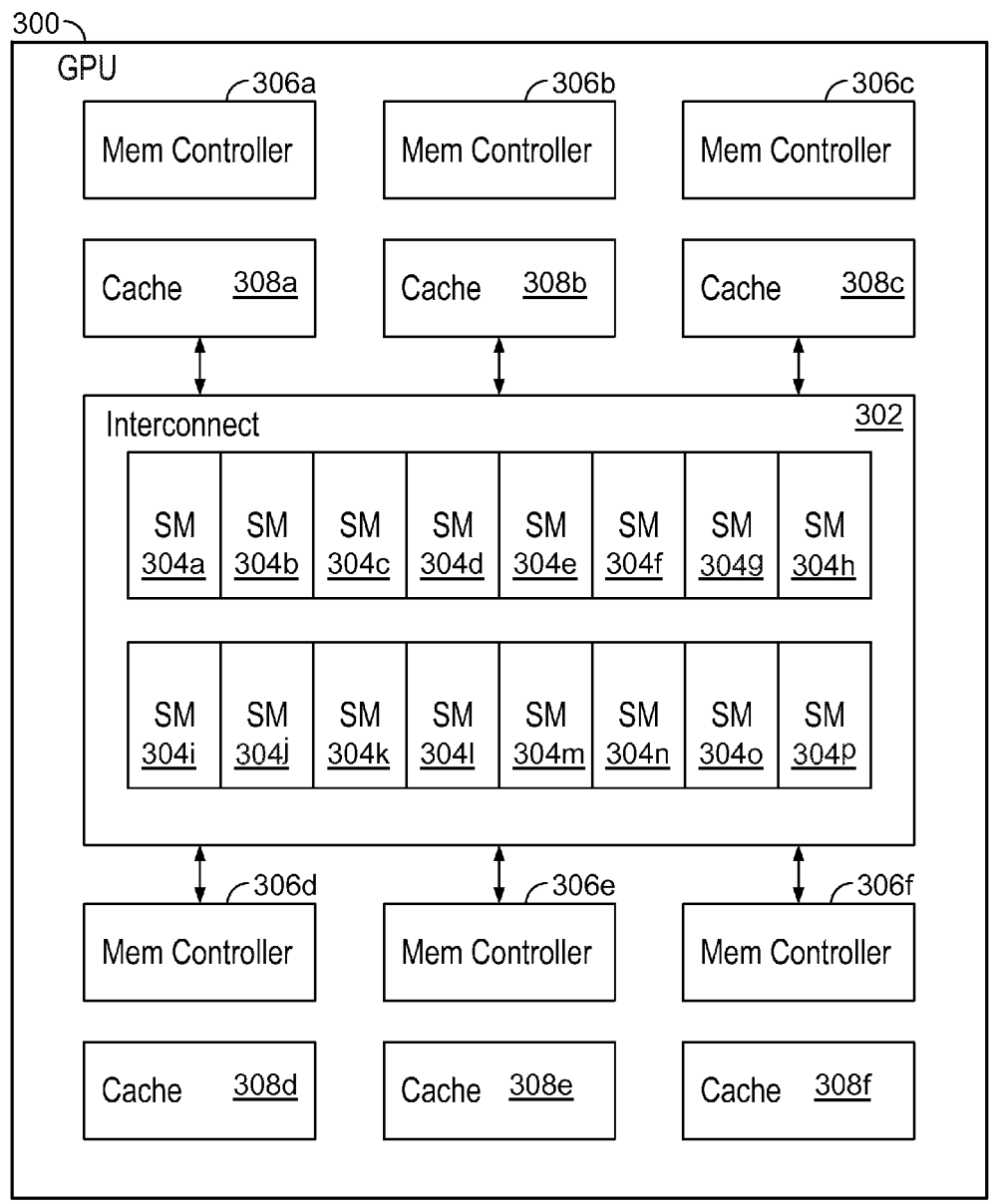
FIG. 3 is a block diagram of the architecture of an example graphics processing unit (GPU).

FIG. 3 is a block diagram of the architecture of an example graphics processing unit (GPU) 300. Although a GPU is shown, the architecture is suitable for various parallel processing tasks.

The GPU includes an interconnect 302 and 16 processing units 304a-p which can be streaming multiprocessors. The GPU includes six memory channels, and each channel includes a cache 308a-f, e.g., a level-2 cache, and a memory controller 306a-f configured to perform memory accesses, e.g., to a dynamic random access memory (DRAM) chip.

The processors are configured to perform parallel processing by executing a number of threads. The threads can be organized into execution groups called warps, which can execute together using a common physical program counter. Each thread can have its own logical program counter, and the hardware can support control-flow divergence of threads within a warp. In some implementations, all threads within a warp execute along a common control-flow path.

Figure 4:
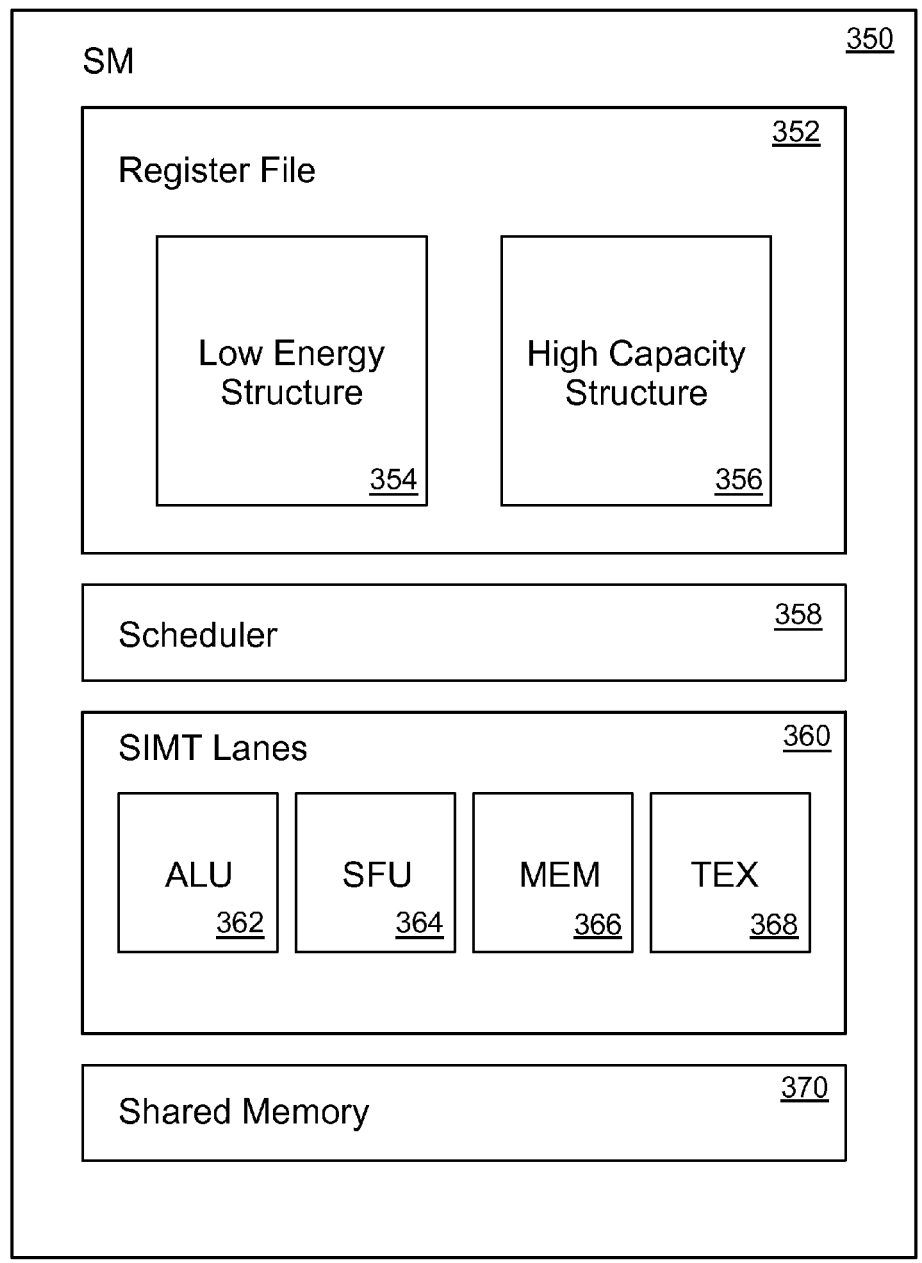
FIG. 4 is a block diagram of an example streaming multiprocessor, which can be one of the processing units of FIG. 3.

FIG. 4 is a block diagram of an example streaming multiprocessor 350, which can be one of the processing units 304a-p of FIG. 3. The streaming multiprocessor can include 32 single-instruction, multiple thread (SIMT) lanes 260 that can collectively issue up to 32 instructions per cycle, one from each of 32 threads. The SIMT lanes can include an arithmetic logic unit (ALU) 362, a special function unit (SFU) 364, a memory unit 366, and a texture unit 368.

The streaming multiprocessor includes a register file 352, a scheduler 358 for scheduling threads or warps or both, and shared memory 370, e.g., local scratch storage. The register file includes a low energy structure 354 and a high capacity structure 356. The streaming multiprocessor is configured to address the register file using a single logical namespace for both the low energy structure and the high capacity structure.

In some implementations, the system includes a number of physical registers which can be shared by the simultaneously running threads on the system. This is useful, for example, because a system can use a single namespace to implement a flexible register mapping scheme. The compiler allocates register live ranges to register addresses, and the compiler can use a register allocation technique to minimize or reduce the number of registers used per thread. Multiple live ranges can be allocated to the same register address as long as the live ranges do not overlap.

Then the system can determine, at runtime and after instructions have been compiled, how many entries per thread will be allocated in the low energy structure and the high capacity structure. For example, the system can map 100% of the register addresses for threads 0-31 to the low energy structure and 100% of the register addresses for threads 32-127 to the high capacity structure. As another example, the system can map 25% of each thread's registers to the low energy structure and to map 75% of each thread's registers to the high capacity structure. The system can determine the number of entries allocated per thread based on runtime information, e.g., regarding the number of warps executing and the marginal benefit from launching more warps or giving a smaller number of warps more space in the low energy structure.

Figure 5:
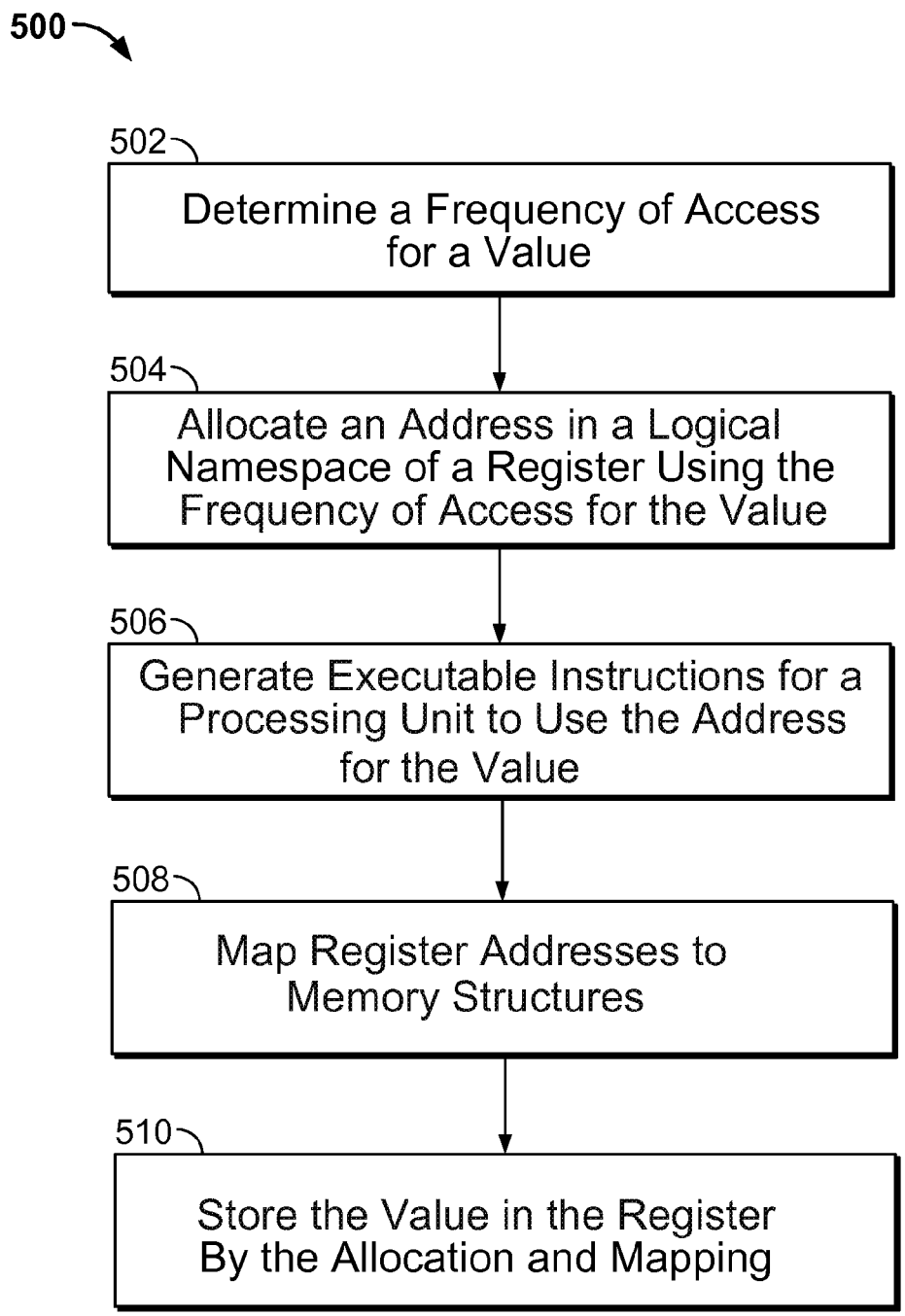
FIG. 5 is a flow diagram of an example process performed by a system of one or more processing units.

FIG. 5 is a flow diagram of an example process 500 performed by a system of one or more processing units. The system can include a compiler that can be implemented in software, hardware, or both.

The system processes source code into executable instructions and, in doing so, determines a frequency of access for a value (502). The frequency of access can be based on the number of times the value is read from a register and the value's lifetime.

The system allocates a register address in a single logical namespace for a register file (504). The register file includes a first memory structure and a second memory structure, the first memory structure having a lower access energy than the second memory structure.

The system generates executable instructions for a processing unit to use the register address for the value (506). The instructions can be, e.g., assembly code or object code.

The system maps register addresses to the first and second memory structures (508). For example, in a multi-threaded system, system hardware can map the register addresses to the memory structures based on a target number of register addresses per thread.

The system executes the executable instructions, e.g., by one of the processing units, and stores the value in the register file according to both the allocated register address and the mapping between register addresses and the first and second memory structures (510).

In some implementations, the architecture and/or functionality of the various previous figures may be implemented in the context of a CPU, graphics processor, or a chipset (i.e. a group of integrated circuits designed to work and sold as a unit for performing related functions, etc.), and/or any other integrated circuit for that matter. Additionally, in some implementations, the architecture and/or functionality of the various previous figures may be implemented on a system on chip or other integrated solution.

Still yet, the architecture and/or functionality of the various previous figures may be implemented in the context of a general computer system, a circuit board system, a game console system dedicated for entertainment purposes, an application-specific system, a mobile system, and/or any other desired system, for that matter. Just by way of example, the system may include a desktop computer, lap-top computer, hand-held computer, mobile phone, personal digital assistant (PDA), peripheral (e.g. printer, etc.), any component of a computer, and/or any other type of logic. The architecture and/or functionality of the various previous figures and description may also be implemented in the form of a chip layout design, such as a semiconductor intellectual property ("IP") core. Such an IP core may take any suitable form, including synthesizable RTL, Verilog, or VHDL, netlists, analog/digital logic files, GDS files, mask files, or a combination of one or more forms.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A system comprising:
a processing unit;
a register file coupled to the processing unit, the register file comprising at least a first memory structure and a second memory structure, the first memory structure having a lower access energy than the second memory structure;
wherein the processing unit is configured to address the register file using a single logical namespace for both the first memory structure and the second memory structure; and
a compiler that is configured to, at compile time:
determine a frequency of access for each value of a plurality of values in code for execution by the processing unit;
allocate a first portion of the plurality of values associated with a low frequency of access to a first portion of register addresses in the single logical namespace for the register file; and
allocate a second portion of the plurality of values associated with a high frequency of access to a second portion of register addresses in the single logical namespace for the register file; and a digital logic circuit that is configured to map each register address in the first portion of register addresses in the single logical namespace to the first memory structure and map each register address in the second portion of register addresses in the logical namespace to the second memory structure.

2. The system of claim 1, wherein the compiler is configured to, for each value:
   determine the number of times the value is read during a live range for the value; and
   divide the number of times the value is read by a lifetime of the live range to determine the frequency of access.

3. The system of claim 1, wherein the compiler is configured to sort the values according to the frequency of access for each value into a sorted order and then allocate the values, based on the sorted order, to the first portion of register addresses and the second portion of register addresses.

4. The system of claim 1, wherein the first memory structure has a first storage capacity smaller than a second storage capacity of the second memory structure, wherein the first memory structure is implemented using a first storage technology and the second memory structure is implemented using a second storage technology, and wherein the first storage technology has a first area per unit of storage greater than a second area per unit storage for the second storage technology.

5. The system of claim 4, wherein the first memory structure is implemented using an array of latches and the second memory structure is implemented using static random access memory (SRAM).

6. The system of claim 1, wherein the system is configured to execute a plurality of threads and determine, at runtime, a number of register addresses per thread to map to the first and second memory structures.

7. A method performed by a processing unit, the method comprising:
   determining, by a compiler at compile time, a frequency of access for each value of a plurality of values in code for execution by the processing unit;
   allocating, by the compiler at compile time, a first portion of the plurality of values associated with a low frequency of access to a first portion of register addresses in a single logical namespace for a register file, the register file comprising at least a first memory structure and a second memory structure, the first memory structure having a lower access energy than the second memory structure; and
   allocating, by the compiler at compile time, a second portion of the plurality of values associated with a high frequency of access to a second portion of register addresses in the single logical namespace for the register file, wherein the processing unit is configured to address the register file using the single logical namespace; and
   mapping, at runtime, each register address in the first portion of register addresses in the single logical namespace to the first memory structure; and
   mapping each register address in the second portion of register addresses in the logical namespace to the second memory structure.

8. The method of claim 7, wherein the namespace defines a range of consecutive addresses for the register file, and wherein the range of consecutive addresses comprises the first portion of register addresses corresponding to the first memory structure and the second portion of register addresses, adjacent to the first portion in the range, corresponding to the second memory structure.

9. The method of claim 7, wherein the first memory structure has a first storage capacity smaller than a second storage capacity of the second memory structure, wherein the first memory structure is implemented using a first storage technology and the second memory structure is implemented using a second storage technology, and wherein the first storage technology has a first area per unit of storage greater than a second area per unit storage for the second storage technology.

10. The method of claim 7, wherein the first memory structure is implemented using an array of latches and the second memory structure is implemented using static random access memory (SRAM).

11. The method of claim 7, further comprising:
   executing a plurality of threads; and
   determining, at runtime, a number of register addresses per thread to map to the first and second memory structures.

12. The method of claim 7, wherein the frequency of access for each value is based on the number of times the value is read during a live range for the value divided by a lifetime of the live range.

13. The method of claim 7, further comprising sorting the values according to the frequency of access for each value into a sorted order before allocating the first portion of the plurality of values and allocating the second portion of the plurality of values.

14. A non-transitory computer readable medium storing instructions that, when executed by a processing unit, causes the processing unit to perform operations comprising:
   determining, by a compiler at compile time, a frequency of access for each value of a plurality of values in code for execution by the processing unit;
   allocating, by the compiler at compile time, a first portion of the plurality of values associated with a low frequency of access to a first portion of register addresses in a single logical namespace for a register file, the register file comprising at least a first memory structure and a second memory structure, the first memory structure having a lower access energy than the second memory structure; and
   allocating, by the compiler at compile time, a second portion of the plurality of values associated with a high frequency of access to a second portion of register addresses in the single logical namespace for the register file, wherein the processing unit is configured to address the register file using the single logical namespace; and
   mapping, at runtime, each register address in the first portion of register addresses in the single logical namespace to the first memory structure; and mapping each register address in the second portion of register addresses in the logical namespace to the second memory structure.

15. The computer readable medium of claim 14, wherein the frequency of access for each value is based on the number of times the first value is read during a live range for the value divided by a lifetime of the live range.

16. The computer readable medium of claim 14, wherein the first memory structure has a first storage capacity smaller than a second storage capacity of the second memory structure, wherein the first memory structure is implemented using a first storage technology and the second memory structure is implemented using a second storage technology, and wherein the first storage technology has a first area per unit of storage greater than a second area per unit storage for the second storage technology.

17. The computer readable medium of claim 14, the operations further comprising:
    executing a plurality of threads; and
    determining, at runtime, a number of register addresses per thread to map to the first and second memory structures.

* * * * *

UNITED STATES PATENT AND TRADEMARK OFFICE
CERTIFICATE OF CORRECTION

PATENT NO. : 9,489,201 B2  
APPLICATION NO. : 14/082476  
DATED : November 8, 2016  
INVENTOR(S) : Brucek Kurdo Khailany et al.

Page 1 of 1

It is certified that error appears in the above-identified patent and that said Letters Patent is hereby corrected as shown below:

In the Claims

Column 8, Line 60 please replace "the first value" with --the value--.

Signed and Sealed this  
Eighteenth Day of February, 2020

Andrei Iancu  
*Director of the United States Patent and Trademark Office*

UNITED STATES PATENT AND TRADEMARK OFFICE
CERTIFICATE OF CORRECTION

PATENT NO.         : 9,489,201 B2
APPLICATION NO.    : 14/082476
DATED              : November 8, 2016
INVENTOR(S)        : Brucek Kurdo Khailany et al.

It is certified that error appears in the above-identified patent and that said Letters Patent is hereby corrected as shown below:

In the Specification

At Column 1, Line number 3, please add the following sentence:
--This invention was made with US Government support under LLNS subcontract B599861 awarded by DOE. The US Government has certain rights in the invention.--

Signed and Sealed this
Twenty-first Day of July, 2020

Andrei Iancu
*Director of the United States Patent and Trademark Office*